United States Patent [19]

Shaw

[11] 4,261,163
[45] Apr. 14, 1981

[54] METHOD AND APPARATUS FOR HARVESTING PRODUCE ON PLASTIC MULCH BEDS

[76] Inventor: Lawrance N. Shaw, 8715 NW. 4th Pl., Gainesville, Fla. 32601

[21] Appl. No.: 34,544

[22] Filed: Apr. 30, 1979

[51] Int. Cl.³ .............................. A01D 46/00
[52] U.S. Cl. ...................... 56/327 R; 56/DIG. 15; 171/32; 171/36
[58] Field of Search ............... 56/327 R, 327 A, 14.3, 56/14.4, 14.5, 14.6, 14.7, 17.2, DIG. 15, 10.2; 171/14, 32, 27, 36

[56] References Cited

U.S. PATENT DOCUMENTS

| 1,483,024 | 2/1924 | Travis et al. | 171/27 |
| 2,473,655 | 6/1949 | Lohn | 56/DIG. 15 |
| 2,559,965 | 7/1951 | Innies | 171/27 |
| 2,641,888 | 6/1953 | Grether | 56/14.5 |
| 2,812,631 | 11/1957 | Koch | 56/246 |
| 3,286,774 | 11/1966 | Lorenzen et al. | 56/327 R |
| 3,353,342 | 11/1967 | Hill et al. | 56/327 R |
| 3,472,009 | 10/1969 | Porter | 56/327 A |
| 3,518,818 | 7/1970 | Porter | 56/327 R |
| 3,543,493 | 12/1970 | Duda, Jr. | 56/327 R |
| 3,587,217 | 6/1971 | Harriott | 56/327 R |
| 3,603,067 | 9/1971 | Wilde | 56/327 R |
| 3,624,990 | 12/1971 | Sinden et al. | 56/327 A |
| 3,653,194 | 4/1972 | Lachman | 56/327 A |
| 3,698,164 | 10/1972 | Boone et al. | 56/DIG. 15 |
| 3,747,312 | 7/1973 | Duncan | 56/327 A |
| 3,921,375 | 11/1975 | Cetrulo, Jr. | 56/327 R |
| 3,973,378 | 8/1976 | Bartaseuch et al. | 56/246 |
| 3,986,324 | 10/1976 | Hariott et al. | 56/327 R |
| 3,986,561 | 10/1976 | Bettencourt et al. | 56/327 R |
| 4,124,970 | 11/1978 | Bernhardt | 56/DIG. 15 |
| 4,141,200 | 2/1979 | Johnson | 56/DIG. 15 |
| 4,141,201 | 2/1979 | Christensen | 56/327 R |

*Primary Examiner*—Paul J. Hirsch
*Attorney, Agent, or Firm*—Macdonald J. Wiggins

[57] ABSTRACT

An apparatus for harvesting produce such as tomatoes and the like growing on plastic mulch covered beds without damage to the plastic mulch or to the fruits, and a method for such harvesting. A narrow reciprocating cutter is moved along the line of plants a short distance above the surface of the plastic film and maintained at the selected height by an automatic height control. A lifting device lifts pendant plant foliage and fruit clear of the plastic mulch surface and above the cutter. After cutting of the stem, a plant is engaged by a conveyor that carries it to the rear of the apparatus. A reel having flexible paddles urges the plants onto the conveyor. The plastic mulch and associated irrigation tubing is not disturbed and other crops may be planted without replacement of the plastic. The apparatus may be pulled and powered from a high clearance tractor in which instance the plants are redeposited on the bed surface for wilting. The apparatus alternatively may be used to replace the below-the-ground cutters of a conventional harvester for tomatoes or the like, and the cut plants deposited on the prior art harvester front end conveyor for in-the-field processing.

1 Claim, 14 Drawing Figures

METHOD AND APPARATUS FOR HARVESTING PRODUCE ON PLASTIC MULCH BEDS

BACKGROUND OF THE INVENTION

1. Field of the Invention

The present invention relates to a method and machinery for harvesting of vegetables or fruits growing on low plants such as tomatoes, and particularly to such plants grown on plastic mulch covered beds.

2. Description of the Prior Art

Tomatoes are typical of the type of crop to which the present invention is eminently suited. In the prior art, it is well known to harvest tomatoes by manual labor and by mechanical harvesters. Mechanical harvesters are available that cut vines free from their roots and transport the cut plants and its fruits to processing equipment which removes the tomatoes from the vines, separates the tomatoes from the foliage and dirt, and sorts the tomatoes as to size and quality.

Typical harvesters are described in the following U.S. Patents: Ries et al, No. 3,078,926; Button, No. 3,390,768 and No. 3,437,151; Seem, No. 3,921,723; Bettercourt et al, No. 3,986,561; and Johnsen, No. 4,090,568. Each of these prior art machines is characterized by cutters that operate at or just below the surface of the soil. Cutters include fixed sweeps, double rotating metal or rubber disks, reciprocating bar sickles, and rotating rods, with all designed to operate below the ground surface. Problems encountered with these types of cutters include: picking up of soil along with the tomato plants; damage to the tomatoes from soil and rocks; and damage to the tomatoes in the separation of soil and rocks. In addition, soil is quite abrasive, wearing out moving parts and causing costly maintenance. Dirt clods are a particular problem and special devices have been necessary in prior art machines for removing such clods.

When tomatoes are grown without stakes and supporting lines as is necessary for mechanical harvesting, the foliage grows in a matted fashion with the lower fruit weighting the matted vines to lie on the surface of the soil bed. The lower hanging fruit is subject to damage by the harvester, even with the cutters operating below the bed surface.

Over the past fifteen years, the technique of growing tomatoes and other plants on plastic mulch covered beds has been developed. Although the method is particularly effective for use in sandy soil, it has proven to have many other advantages: cleanliness of the fruit; good control of weeds; improved action of soil fumigants; reduction of root rot; reduction of soil moisture evaporation; prevention of soil erosion; and protection against freeze damage. The plastic mulch is becoming more widely used; for example, during the 1976-77 season in Florida, about 75% of the 13,700 hectares of fresh market tomatoes produced in that state were grown on plastic mulch covered beds. Planting is through holes punched or burned in the plastic film. It is also common to include drip irrigation tubing along the bed underneath the plastic mulch for watering and fertilizing of the bed. This system of growing tomatoes has proven to be more energy efficient per unit of product than the traditional system of growing the plants on bare ground. Thus, the technique may be expected to become more widespread throughout the United States.

Available mechanical harvesters have proven unsatisfactory for operation over plastic mulch beds. The plastic film becomes torn and shredded, causing clogging of conveyor belts, separators, and other moving parts of the machinery, and the irrigation tubing is usually damaged. For this reason, tomatoes and other produce grown on plastic mulch must be harvested manually. In addition, stakes and lines must be provided for ease of hand picking, which significantly increases costs. With shortages of field labor becoming common, losses can occur from failure to harvest tomatoes on time since this crop can change daily. Delays in harvesting often result in overripeness, sunburn, insect damage, mold and the like.

For the reasons discussed above, there has been a long felt need for a practical, effective mechanical harvester head that can cut plants slightly above the surface of the bed and which can be used over both soil and plastic mulch beds without picking up soil or damaging plastic film and irrigation tubing.

SUMMARY OF THE INVENTION

The invention is a novel harvester head end and method of harvesting for tomato plants and like produce that is particularly suited for use over plastic mulch covered beds. The invention is equally advantageous when operating over bare soil beds and can harvest plants without dirt clods or fine soils being picked up along with the plants. Tests have shown that use of the invention can reduce costs by 60% to 75% over manual harvesting. In addition, the plastic mulch covered beds can be replanted with other crops without replacing the plastic film or irrigation tubing, thereby utilizing the nutrients remaining in the beds. Since the drip irrigation tubing is also intact, additional nutrients and fertilizer can be introduced for subsequent crops when necessary.

The harvester head or front end comprises a novel reciprocating sickle cutter operated and maintained less than ¾ of an inch (2 cm) above the surface of the plastic, means for lifting the lower portions of the plants to permit the cutter to sever the plant stems without damaging the lower hanging fruit, and a short conveyor for carrying the plants rearwardly from the cutter. The apparatus is carried in a framework chassis supported by a pair of gage wheels that ride in the furrows between the beds. The harvester front end may be used in either of two modes. In one mode, the chassis is pulled behind a high clearance tractor with the various moving parts hydraulically powered from the tractor. The plants are lifted, cut, deposited on the conveyor, carried to the rear of the machine, and the severed plants dropped back on the bed. The plants are allowed to wilt and are later picked up by a prior art machine for processing to remove, separate and grade the fruit. The wilting of the plants in this mode facilitates the later separation of tomatoes from the vines. In the other mode, a prior art harvester having on-board processing means has its conventional cutter assembly removed, and the harvester head end of the invention is installed in front of the prior art machine's conveyor. Thus, the head end of the invention cuts and picks up the plants without damage to the beds, and delivers the cut plants to the prior art conveyor. The plants are then conventionally processed in the field by the appropriate functions of the prior art machine.

It is therefore a principle object of the invention to provide a method and apparatus for harvesting plants by cutting the stems thereof slightly above the beds without damage to the beds or to the fruit of the plants.

It is another object of the invention to provide a method and apparatus for harvesting plants growing on plastic mulch covered beds without damage to the plastic film thereby permitting use of the plastic film for additional crops.

It is yet another object of the invention to provide apparatus for harvesting tomato plants or the like, by controlling a cutter to operate a short selected distance above the bed.

It is still another object of the invention to provide a method and apparatus for harvesting tomato plants or the like growing on plastic mulch covered beds without the need for strings or stakes by lifting the low hanging portions of the plants clear of the bed before cutting of the stems.

It is a further object of the invention to provide apparatus for harvesting tomato plants and the like that carries harvested plants rearward from the point of cutting for redepositing on the growing bed, or depositing onto a processing machine.

It is yet a further object of the invention to provide a plant-harvesting head end apparatus that may be towed behind a tractor for cutting the plants, and redepositing the cut plants back on the bed to allow wilting to take place.

It is still another object of the invention to provide a plant-harvesting head end apparatus that may be attached to the front end of a prior art harvesting/processing machine such that the apparatus delivers cut plants to the machine for further processing, such as separating and grading of the fruit.

These and other objects and advantages of the invention will be noted by a reading of the following detailed description, in conjunction with the accompanying drawings.

DETAILED DESCRIPTION OF THE PREFERRED EMBODIMENT

Figure 1:
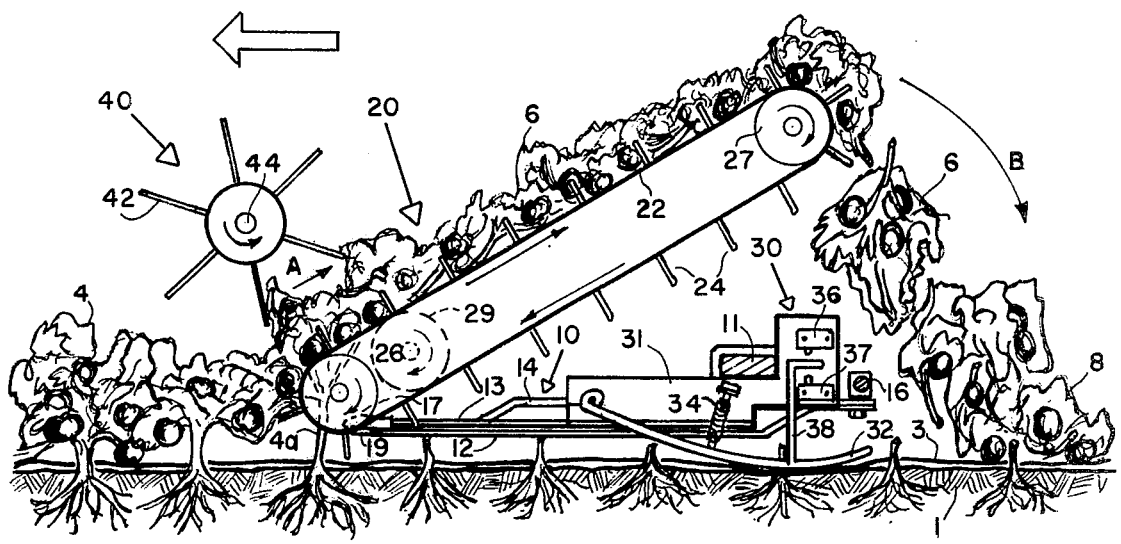
FIG. 1 is a schematic side view of the invention showing the operation thereof, with a cutter assembly, a cutter height control sensing device, a lifting and conveying means, and a plant-directing reel illustrated.

Referring to FIG. 1, a schematic diagram representative of the invention in operation is shown in partial side view with the chassis and supporting and drive elements omitted for clarity. A typical seed bed 1 for tomato plants and the like is shown in cross section covered with a plastic mulch 3. Growing through perforations in the plastic mulch 3 are tomato plants 4 with one such plant 4a shown just prior to cutting of its stem. The elements of the invention shown are moving over the bed 1 in the direction of the open face arrow. Four major elements of the apparatus are schematically illustrated: cutter assembly 10 for cutting the stems of the tomato plants 4; lifter and conveyor 20 for lifting pendant lower portions of plants 4 and conveying cut plants 6 rearwardly; reel 40 for urging cut plants onto conveyor 20; and height sensing assembly 30 used as part of a system to maintain cutter assembly 10 a selected distance above the surface of plastic mulch 3.

Tomato plants, such as plants 4, are planted in rows along the center line of bed 1 and spaced about one foot apart. Cutter assembly 10 is thus arranged to move longitudinally along the center line of bed 1 as best seen in the top view of FIG. 2. Cutter assembly 10, to be described in greater detail with reference to FIGS. 8 and 9, includes a fixed upper blade having a set of V-shaped teeth 17, and a matching lower reciprocating blade having a matching set of V-shaped teeth 19 such that a plant stem contacted by cutter 10 is quickly and cleanly severed by the blades.

Two styles of planting tomatoes are in common use. Stake planting, with stakes and strings, is generally used over plastic mulch covered beds which heretofore have required hand harvesting. This style of planting provides easy access to the fruit for manual harvesting; however, the material and labor for installing and later removing stakes and strings add significantly to production costs. A bush type planting style does not use stakes and strings, and the plants are allowed to spread out over the width of the bed, with each plant growing from a central stem from which the branches carrying the leaves and fruit bush outward. The branches and growth from one plant to the next tend to intermingle forming a matted growth of vegetation. The spreading effect from bush planting and the weight of the tomatoes on the branches result in drooping of the lower portions with some fruit resting on or near the bed surfaces. Bush planting is commonly limited to use over soil beds for mechanical harvesting with the necessity for the harvester cutting blades to cut the plant stem below the bed surface to prevent damage to the low hanging fruit. When this type of planting has been attempted in plastic mulch covered beds, the plastic film is destroyed by below the surface cutting, and a large percentage of fruit is damaged by above the surface cutting with prior art harvesting apparatus.

Figure 2:
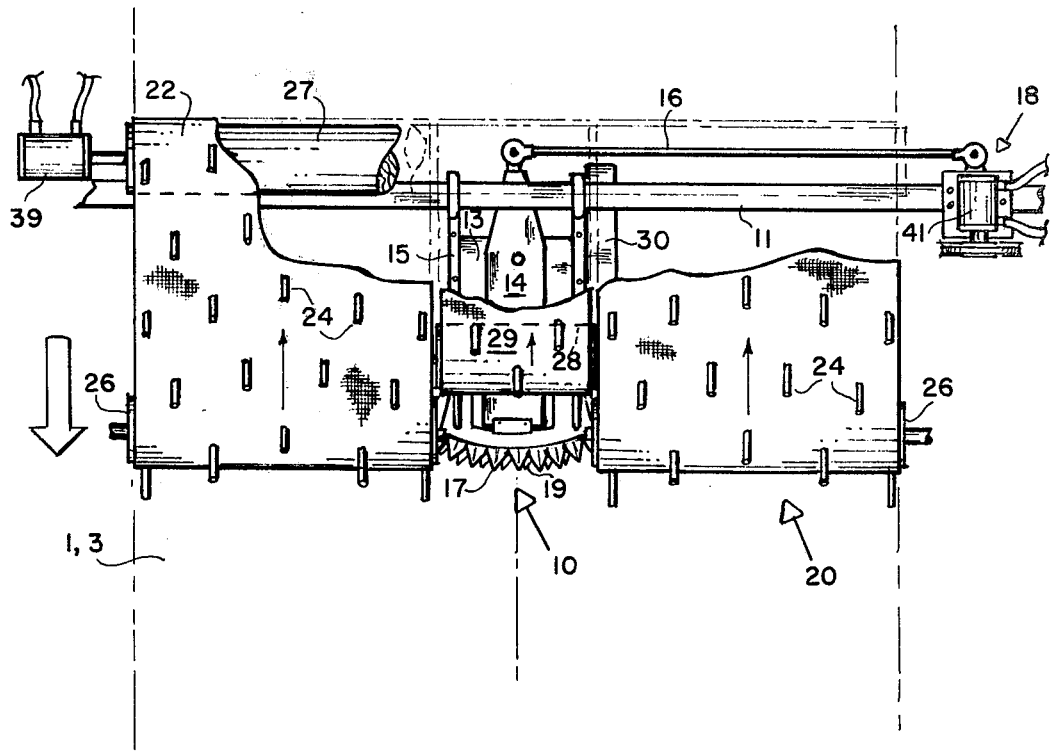
FIG. 2 is a partial cutaway top view of the invention showing the cutter and lifting and conveying means of the preferred embodiment.

As shown in FIG. 1, the present invention allows above the surface stem cutting without damage to the plastic film and without damage to the low hanging fruit. Bush planted tomatoes are here illustrated growing on plastic mulch 3, with lifter/conveyor 20 serving to lift low hanging plant branches and fruit clear of mulch 3 and cutter assembly 10, allowing cutter 10 access to the stem of plant 4a thereby protecting such fruit from damage. Lifter/conveyor 20 utilizes a pair of endless flat belts 22 having a set of rubber covered fingers 24 projecting from their surfaces. The belts 22, as best seen in FIG. 2, are disposed on either side of and slightly ahead of cutter assembly 10 and supported at the front end by forward rollers 26. Belts 22 are driven from rear roller 27 which extends the width of both belts. A shorter belt 29 is disposed just back of cutter blades 17, 19 and between belts 22 with a forward roller 28 indicated by dashed lines, and driven from common rear roller 27 by hydraulic motor 39. As the apparatus moves forward, the fingers 24 on belts 22, which are rotating clockwise as viewed in FIG. 1, contact and lift the branches, leaves, and fruit of the plant being approached. As discussed above, the plants grow so as to mat the leaves together from plant to plant; thus, the entire forward area of a plant 4a will be lifted clear of the plastic mulch surface 3. As the harvester continues to move forward, plant 4a is carried higher and rearward by belts 22 as indicated by arrow A. Cutter assembly 10 then contacts the plant stem a short distance above mulch 3 and cleanly cuts the stem. The cut plant, as illustrated by plants 6, is then carried by belts 22 and belt 29 in an upward and rearward direction due to the inclined disposition of conveyor assembly 20 as shown in FIG. 1. In one mode of operation of the invention, plants 6 are dumped to the rear of the harvester to be redeposited on the bed surface as shown by arrow B. In this mode, the redisposited plants 8 are left in the field for a brief period to allow the plants to wilt, making later separation of tomatoes from the plants much easier to accomplish.

Figure 4:
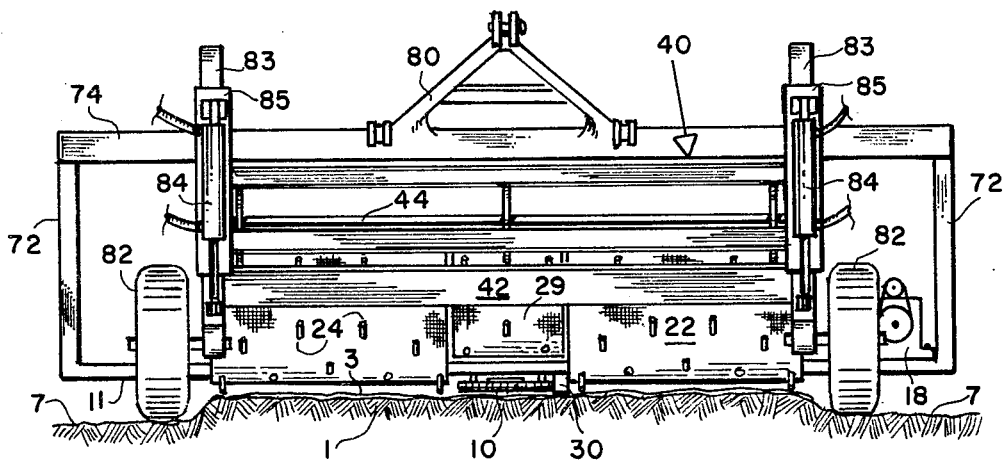
FIG. 4 is front view of the preferred embodiment of the invention adapted to be drawn by a tractor.
Figure 5:
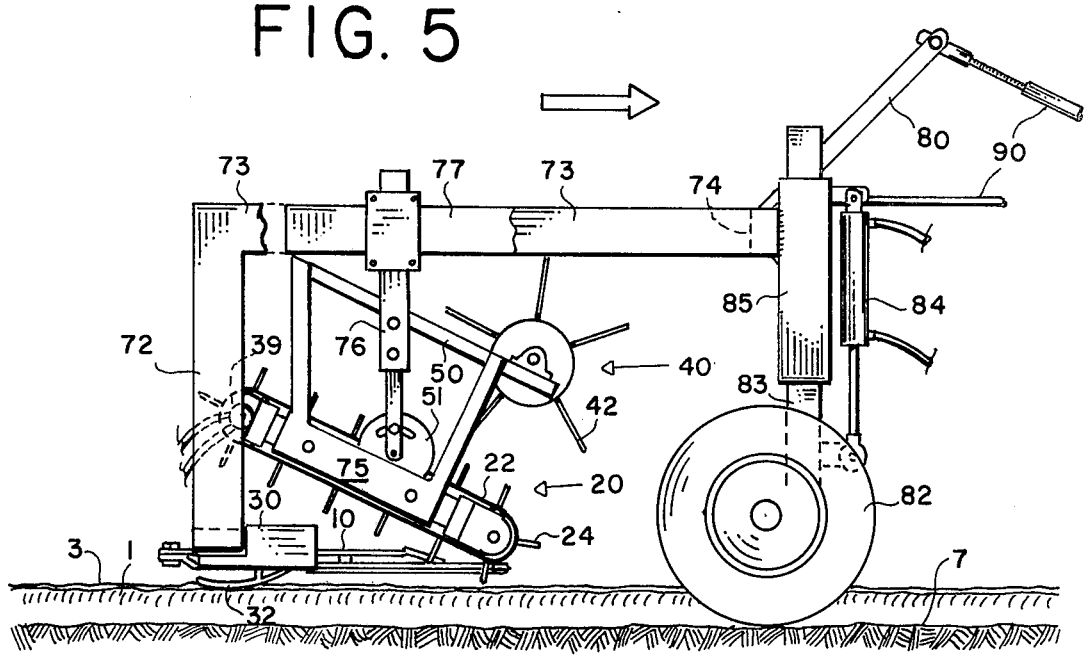
FIG. 5 is a right-side view of the embodiment of the FIG. 4.
Figure 6:
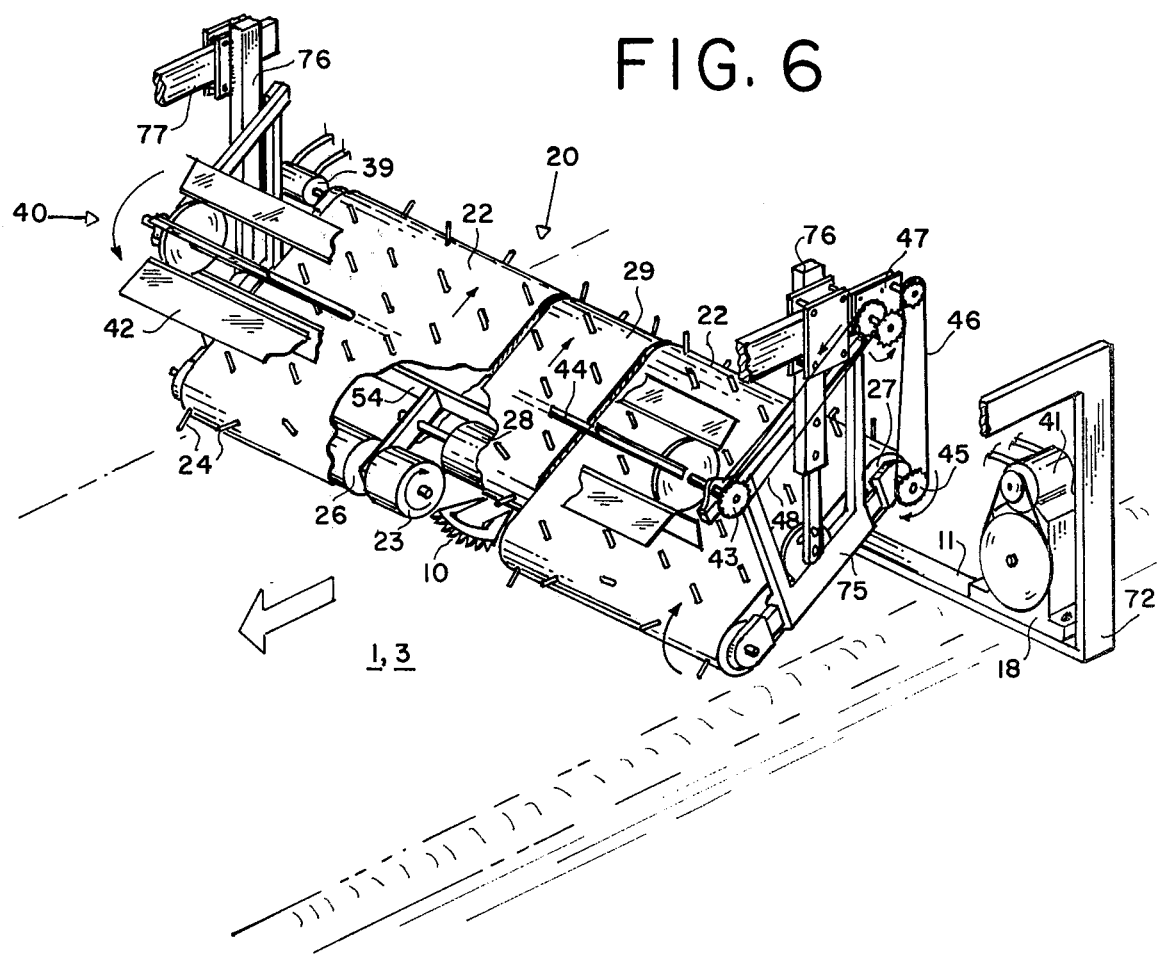
FIG. 6 is a partial cutaway perspective view of the preferred embodiment showing details of the construction of the lifting and conveying means.

To ensure that plants 4 are securely caught and carried by conveyor belts 22 and 29, reel 40 is advantageously provided. Reel 40 rotates counter clockwise on shaft 44 in the view of FIG. 1. Shaft 44 supports a plurality of flexible paddles 42 disposed radially around its circumference, with paddles 42 having a width equal to the width of conveyor 20. Reel 40 is mounted transverse to the direction of travel of the harvester and slightly above the forward end of conveyor 20 as best seen in FIGS. 4, 5 and 6. The peripheral speed of reel 40 is selected to essentially match that of belts 22 and 29. As fingers 24 engage the lower portions of the plants, paddles 42 moving downward and rearward urge the upper portions of the plants toward the belts 22, 29, thereby countering any tendency for a plant to fall forward after cutting. The plants 6 are then firmly engaged by fingers 24 and carried toward the rear as previously described.

It is important that cutter assembly 10 be an optimum distance above the surface of bed 1 and plastic mulch 3. If too low, cutter blades 17, 19 can contact plastic mulch 3, cutting and tearing the plastic film. If too high, the cutter assembly 10 can contact plant limbs and fruit with consequent damage thereto. It has been found for tomato plants that a height of about ¾ inch is effective. Due to the irregularities of produce beds, an automatic height adjustment system has been found highly desirable to maintain the selected height, and greatly reduces or eliminates both produce and mulch damages. Accordingly, a height sensing assembly 30 is utilized to control a height adjustment apparatus to be described below. Cutter assembly 10 is supported by brackets 15 attached to transverse frame member 11 which also supports height sensor mounting plate 31. A skid 32 is pivoted to plate 31 and arranged to slide along plastic mulch 3 and bed 1 as the harvester moves forward. An upward extending arm 38 is formed to operate Microswitches 36 and 37. When the cutter height is correct, arm 38 is essentially centered as shown in FIG. 1 and neither switch is closed. If the cutter height is too low, upper switch 36 will be closed, and, if too high, lower switch 37 will be closed. Operation of switches 36 and 37 causes frame member 11 to be raised or lowered by hydraulic means to be later described. Spring 34 maintains a strong downward bias on skid 32 sufficient to crush loose tomatoes or plant parts that could otherwise produce a false height indication.

Additional details of the drive system for cutter assembly 10 may be noted from FIGS. 1 and 2. A wobble-plate drive unit 18 operates from a hydraulic motor 41 to produce a reciprocating motion, driving cutter arm 14 via pitman arm 16. It is important that the lower cutter blades 19 move relative to stationary upper blades 17 to prevent plants moving over the upper part of cutter assembly 10 from being damaged. Arm 14 is therefore arranged to reciprocate lower plate 12 and blades 19.

Having hereinabove described the principle of operation of the preferred embodiment of the harvester of the invention, details of the construction thereof will be explained with reference to FIGS. 3, 4, 5, and 6.

Figure 3:
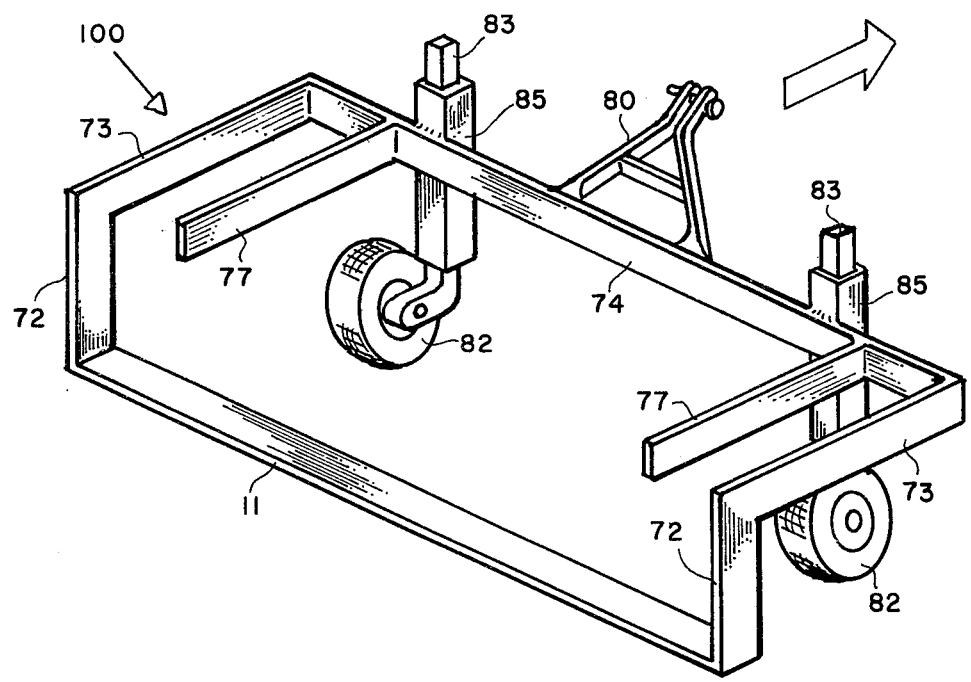
FIG. 3 is a simplified representation of the chassis of the preferred embodiment with the gage wheels attached thereto.

FIG. 3 is a simplified view of the frame or chassis 100 for supporting the operative parts of the invention. The direction of travel is indicated by the open faced arrow, with the chassis being pulled by a tractor utilizing yoke assembly 80 attached to the front of member 74. Square steel tubes 85, also attached to the front of member 74, support gage wheel posts 83 which slide within tubes 85. Posts 83 are attached to a pair of gage wheels 82 that ride in the furrows between beds while the harvester is in operation. The height of the chassis 100 above a plant bed is adjusted by sliding of posts 83 in tubes 85 utilizing hydraulic power to be described herein below. Rearward extending side members 73 support rear vertical members 72 and rear cross member 11. Two cantilvered arms 77 also project rearward from front cross member 74.

FIGS. 4, 5, and 6 illustrate the manner in which the various components of the exemplary embodiment of the invention are mounted on frame 100 of FIG. 3. FIG. 4 is a front view of the harvester as arranged to be attached to the rear of a tractor by three point hitch yoke 80. The tractor may have a hydraulic system for operation of various elements of the invention and a high clearance since it will be required to straddle the plant bed with the harvester pulled behind. FIG. 5 provides a right side view of the harvester showing the mounting of the cutter assembly 10, conveyor 20, and reel 40. This view shows rearward-extending member 73 cut away to reveal cantilevered arm 77 with conveyor assembly 20 supported therefrom by vertical support post 76. Post 76 is formed by two telescoping structural forms to permit a vertical adjustment on initial assembly. Conveyor 20 is attached to posts 76 by end pieces 75 and angle plates 51 which pivot about the lower ends of posts 76, permitting the adjustment of the angle of conveyor belts 22 and 29 with respect to the beds. A hydraulic motor 39 serves to drive rear roller 27 which powers belts 22 and 29. Yoke 80 is attached to front cross member 74 for coupling to a tractor with three point hitch 90. Also shown in FIG. 5 is hydraulic actuator 84 connected to wheel tube 85 and wheel post 83. Hydraulic fluid and pressure is supplied the harvester from the towing tractor hydraulic system for the operation of actuators 84 and the hydraulic motors such as motor 39. Support 50 in FIG. 5 serves to mount reel 40. The harvester assembly is moved by the tractor in the direction of the open faced arrow with height sensing skid 32 moving along the raised bed 1 over plastic mulch 3 with gage wheels 82 riding on the surfaces of furrows 7 shown in cross section.

Additional details of the supporting structure and drive mechanisms of the preferred embodiment may be found in FIG. 6 in which conveyor assembly 20, reel 40, and various supports are shown in partial cutaway view. Conveyor vertical support posts 76 are seen here attached to fragmentary sections of cantilevered arms 77. Reel 40 is shown having paddle blades 42 of flexible materials across the width of belts 22 and 29. Reel 40 is driven by sprocket 43 and chain 48 to rotate counter-clockwise when viewed from the left end. Power is supplied to chain 48 via reversing sprocket assembly 47 which in turn is driven via chain 46 and sprocket 45 on the left end of rear roller 27. Roller 27 is driven by hydraulic motor 39.

In the cutaway areas of reel 40, belt 22, and belt 29, details of the mounting of the front rollers 26, 23, and 29 are revealed. A support bracket assembly 54 is shown which accepts the shaft of lower roller 28 for belt 29. Right belt 22 is shown cutaway to expose the split configuration of the front roller for belt 22 which consists of sections 26 and 23 which are supported by the cantilevered arm of bracket assembly 54. Assembly 54 is attached at either side of the conveyor to roller end supports 75. This novel arrangement of outside belts 22 and shorter inside belt 29 provides a space for cutter assembly 10 to the rear of the front edges of belts 22. Therefore, lifting fingers 24 can lift the forward pendant foliage and fruit of the plants as the harvester moves forward in the direction of the open faced arrow, allowing the foliage and fruit to clear the reciprocating blades of cutter assembly 10 thereby preventing possible damage to the fruit. As the cutter 10 approaches the stem of a plant, the upward and rearward motion of fingers 24 projecting from belts 22 lift the plants even further with the fingers of belt 29 then also catching the foliage as it progresses rearwardly. Paddles 42 of reel 40 assist in urging the top portions of the plants onto belts 22 and 29.

Fragments of left side member 73 and rear cross member 11 are also seen in FIG. 6 along with vertical member 72 showing the mounting of wobble plate drive 18 with hydraulic motor 41 for operating cutter assembly 10.

Figure 7:
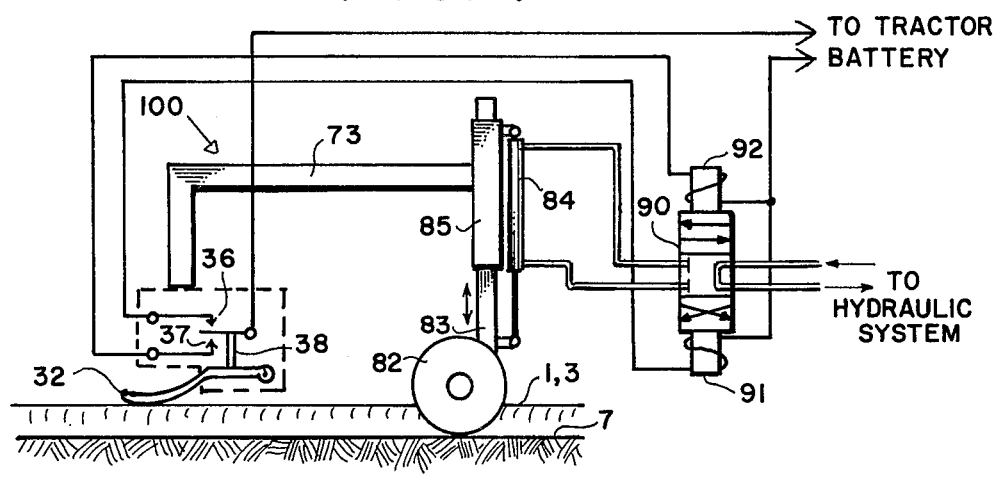
FIG. 7 is a schematic diagram of the electro-hydraulic cutter height control system of the preferred embodiment.

FIG. 7 is a schematic diagram of a preferred height control system of the invention utilizing hydraulic actuator 84 in conjunction with an electrical control system. The frame 100 is represented in a left side schematic view as members 73 and 72, fixed gage wheel tube 85, movable gage wheel post 83, and gage wheel 82; although it is to be understood that a similar actuator 84 and gage wheel assembly 82, 83, and 84 are also on the right side of frame 100 and operate in concert with the corresponding left side elements. Actuator 84 is attached to tube 85 with its actuating rod attached to post 83 whereby operation of actuator 84 will raise or lower frame 100 by the telescoping action of tube 85 and post 83. Height sensor 30 is indicated schematically as skid 32 operating a single pole, double throw switch via switch arm 38 with the switch having an UP contact 36 and a DOWN contact 37. Thus, as frame 100 moves in the direction of the open faced arrow, skid 32 senses the height of the bed surface relative to the height of gage wheels 82. For example, if furrow 7 rises, causing the cutter assembly 10 to be lifted too high from the bed surface, contact 37 will close as skid 32 drops. Contact 37 operates solenoid 92 with the battery of the towing tractor furnishing the necessary electrical power. Solenoid 92 operates four way valve 90 to apply hydraulic pressure from the tractor hydraulic system to the lower port of actuator 84 with the return to the upper part. This action lowers tube 85 with respect to wheel 82, causing skid 32 to open contact 37, returning valve 90 to neutral. The hydraulic pressure and flow are adjusted to provide a smooth change in height with sufficient spacing between switch contacts to prevent overshoot and hunting. The reverse to the above described action occurs if cutter assembly 10 drops due to variations in the furrows 7 or the bed 1, through operation of contact 36, solenoid 91, and valve 90. The pressure to actuator 84 is then the reverse causing chassis 100 to move up relative to wheel 82, bringing cutter assembly 10 back to its selected distance above bed 1. While an electrical-hydraulic system has been shown for exemplary purposes, the system may be all-hydraulic or all-electrical with the same functional results.

Figure 8:
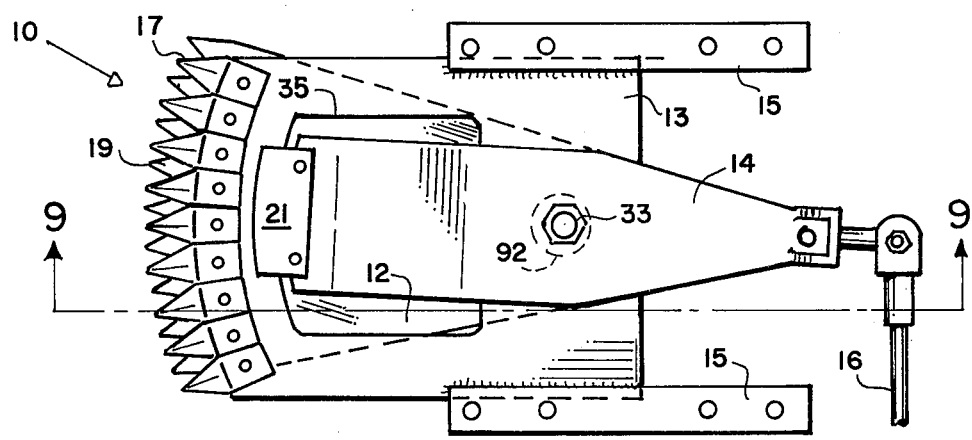
FIG. 8 is a top view of the sickle cutter assembly.
Figure 9:
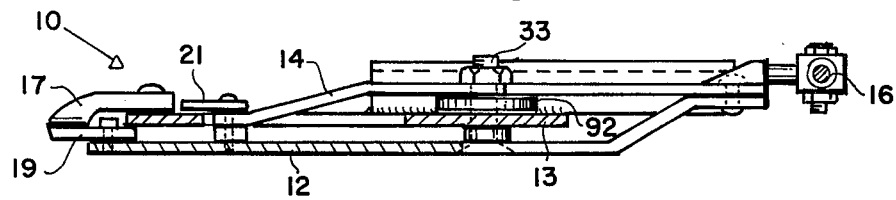
FIG. 9 is a cross sectional view 8—8 of the cutter assembly of FIG. 8.

Details of novel cutter assembly 10 are shown in FIGS. 8 and 9, with FIG. 8 being a top view and FIG. 9 a view through section 9—9 of FIG. 8. A body plate 13 is provided having mounting brackets 15 welded at its rear portion. The front edge of plate 13 is arcuate shaped for mounting a plurality of cutter teeth 17 which may be commercially available units widely used in agricultural cutters and known as mower stub guards. A lower plate 12 having a wedge or pie shape, is pivoted by pivot pin and bearing 92 and has an arcuate front edge essentially coincident with the front edge of plate 13. Cutter teeth 19 are of a sickle section type to match stub guard teeth 17 and are mounted along the front edge of plate 12, thus forming a V-teeth blade cutting assembly 17, 19. To move lower plate 12 and to form a more rigid assembly, drive plate 14 is attached to lower plate 12 at the rear and formed to be attached to the front of lower plate 12 through an opening 35 in body plate 13. A guide tab 21 is attached to the forward end of plate 14 so as to maintain close contact between cutters 17, 19 as best seen in FIG. 9. With the assembly 10 attached to rear cross member 11 of frame 100, as shown in the earlier figures, pitman arm 16 causes a reciprocating motion of lower plate 12 and drive plate 14 about pivot 33, thereby operating cutters 17 and 19. It has been found important to have the lower cutters 19 in motion rather than the upper cutters 19, as done in prior art cutters, in the event that fruit may occasionally drag across the upper area of cutter assembly 10.

PROPULSION OF THE HARVESTER FRONT END

As described above, the invention resides in a harvester which represents a "head end" for cutting plants which will require subsequent processing. The invention is thus concerned with the critical operation of mechanically cutting plants growing on soil and plastic mulch covered beds without damaging or disturbing the bed surfaces, and conveying the cut plants for further processing. As illustrated in FIGS. 4 through 7, it is contemplated that the invention will be towed behind a high-clearance tractor and will obtain hydraulic and electrical power therefrom for the operation of the motors, actuators, and controls. It is obvious that the hydraulic motors could be replaced by electric motors, or the functions of the motors provided by gears, sprockets, and chains or the like powered from a power take-off on the tractor. As discussed, in the tractor propelled application, the plants are cut and redeposited on the mulch for wilting before collecting for further processing.

Figure 10:
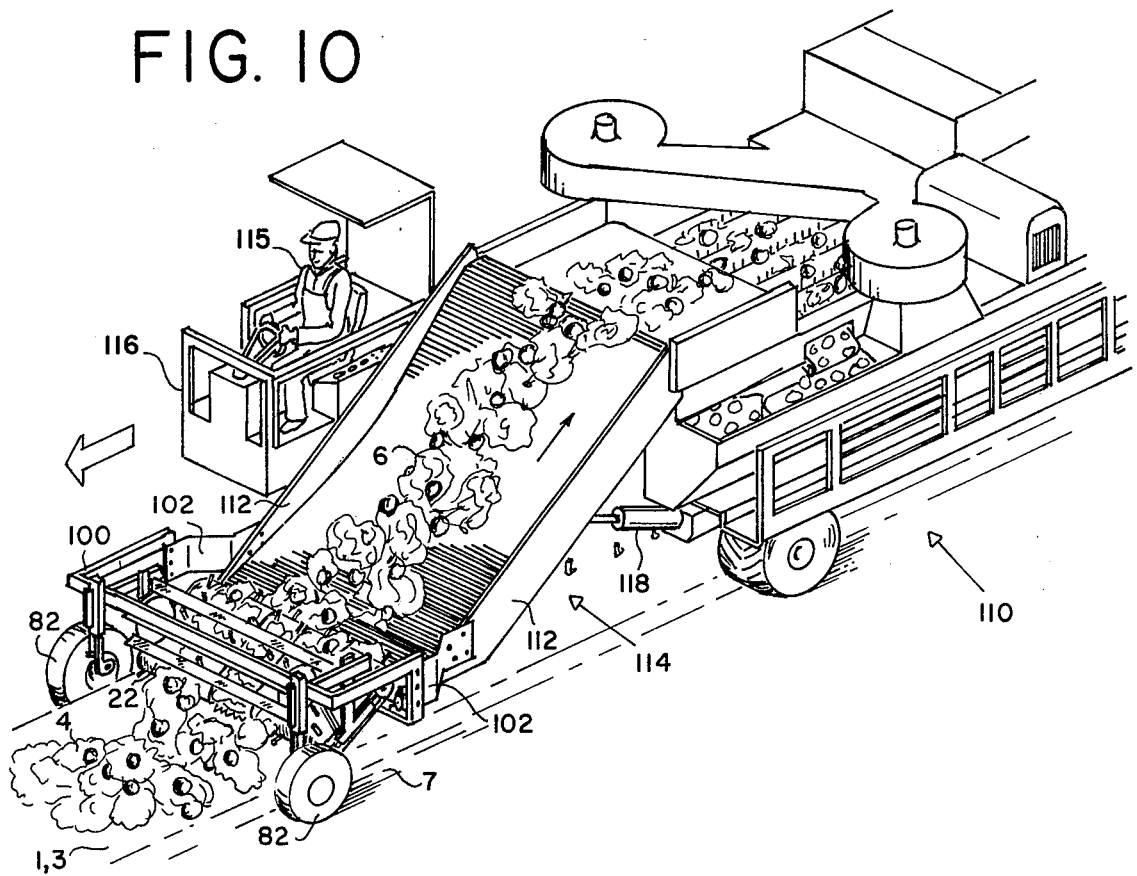
FIG. 10 is a perspective view of the preferred embodiment of the invention attached to a prior art harvesting/processing machine in place of the conventional cutter and head end assembly thereof.

Another important and advantageous application of the disclosed harvester head end is shown in perspective view of FIG. 10. The rear portion of a commercially available tomato harvesting and processing machine 110 is shown, which may be an FMC Model 5500T, for example. Another suitable machine for this application is the Button-Johnson Fresh Market Tomato Harvester. Such harvesters are designed for harvesting tomatoes from bare soil beds and have proven unsuitable for use over plastic mulch covered beds. The machines are self-powered having integral electrical and hydraulic systems, and propulsion systems. Machine 110 comes equipped with a pair of gage wheels and a hydraulic control means for raising and lowering a forward conveyor 114 relative to the gage wheels. Also, a straight sickle cutter bar the width of the bed is installed below the front edge of conveyor 114. In the present application, the gage wheel assembly, the sickle cutter bar, and the associated driving gear are all removed from machine 110. The frame 100 of the invention is attached to conveyor side plates 112 of machine 110 by steel brackets 102, thus supporting the lower front end of conveyor 114 by the gage wheels 82 of the invention. The hydraulic cutter height control system of FIG. 7 is connected to the hydraulic system of machine 110. As the actuators 84 of the invention raise and lower the cutter assembly 10 as required by ground conditions, conveyor 114 will also be slightly raised or lowered, pivoting about a point at its upper end. Machine 110 may also incorporate a large actuator 118 attached to the underside of conveyor 114 and to the chassis of machine 110. It may be desirable to couple and operate actuator 118 in synchronism with actuators 84 because of the additional weight of conveyor 114.

As may now be seen, this configuration of the invention advantageously provides a novel head end cutting, lifting, and conveying means to deliver clean and undamaged fruit plants to harvester-processor 110. The operator 115 controls the composite machine from cab 116, maintaining the forward gage wheels in the furrows 7 as the machine moves in the direction of the open faced arrow. As the plants are lifted by belts 22, cut by cutter 10, and conveyed rearwardly by belts 22 and 29, the cut plants are then deposited on the forward end of conveyor 114 and carried upward as shown by the arrow. Machine 110 includes means for separating the tomatoes from the vines, removing trash from the fruit, and sorting the fruit. The invention essentially eliminates soil pick-up so the soil eliminating apparatus of machine 110 is not needed. Sorting may be done by a crew riding on the machine 110, or electronic color separators may be provided. As is now apparent, the invention in combination with available harvester/-processors can provide very fast, low cost harvesting and processing of tomatoes and the like produce from plastic mulch covered beds, with the final produce being much cleaner and having less damage due to the elimination of dirt, rocks, and the like found in soil bed harvesting. Furthermore, the plastic mulch is left intact and may be used with another crop with additional cost savings in labor and materials.

ALTERNATIVE EMBODIMENTS

Figure 11:
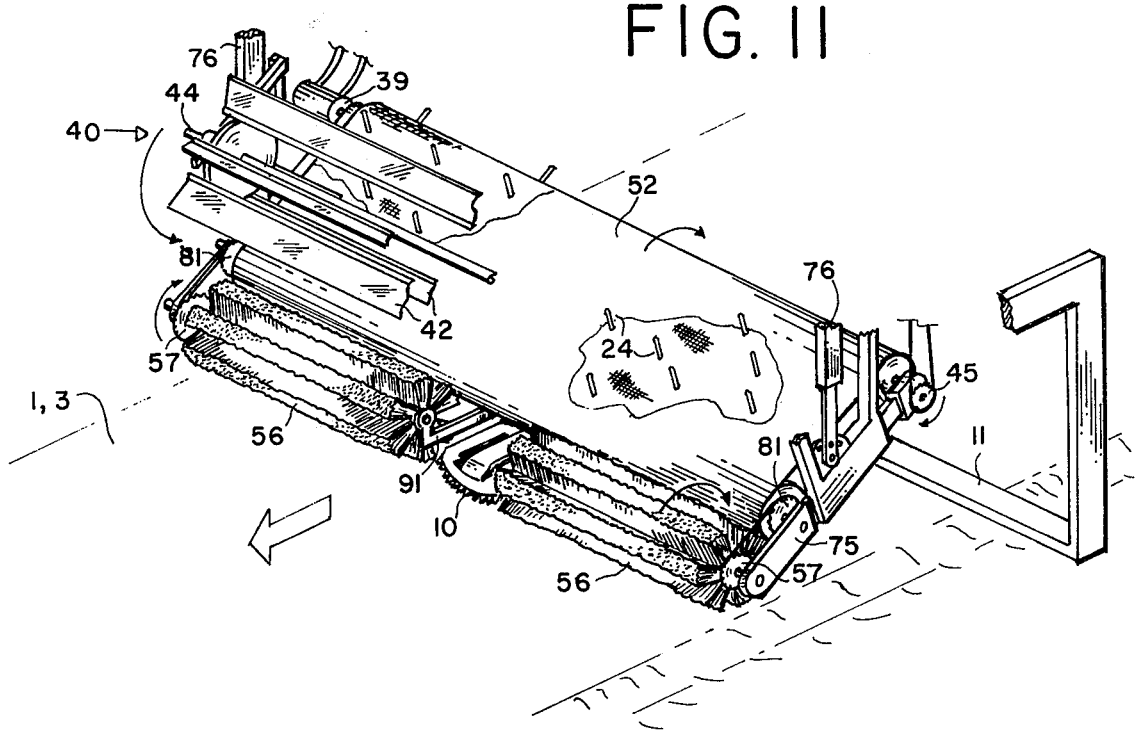
FIG. 11 is a partial and cutaway view of an alternative embodiment of the invention utilizing a rotary brush as a plant lifting device.

An alternative means for lifting the forward portions of the plants prior to cutting is shown in the embodiment of FIG. 11. A partial view of the main elements of the invention is shown with only fragmentary portions of the frame 100 and reel 40 included. In this version, a wide single-piece endless belt 52 having a pattern of rubber covered projecting fingers 24 is utilized and is disposed somewhat to the rear of cutter assembly 10. A pair of transverse rotating brushes 56 whose bristles are in cylindrical form are mounted ahead of the lower front edge of belt 52. The forward bristles of brushes 56 are ahead of the cutter assembly 10. Brushes 56 are rotated clockwise as viewed from the left side of the apparatus in FIG. 11 and as shown by the arrows. The outside ends of the shafts of brushes 56 are supported by end frames 75 and the inside ends by brackets 91 that curve under belt 52 and are attached to cross member 11. Rotation of brushes 56 is provided from hydraulic motor 39 via brush drive sprockets 57 and 81, and is relatively slow so as to allow the bristles to gently catch and pick up the forward pendant foliage of the plants. As the harvester moves forward in the direction of the open faced arrow, the brushes 56 carry the foliage over and onto belt 52. Fingers 24 may be somewhat shorter than in the preferred embodiment since they are not required to lift the plants but only to engage the foliage to convey the plants to the rear. An advantage of brushes 56 as the lifting means is that the flexibility of the bristles may be selected to give good lifting action yet not bruise or otherwise damage tomatoes. The continuous nature of the brushes also prevents an isolated branch from being missed by the lifting means and some fruit lost.

Figure 12:
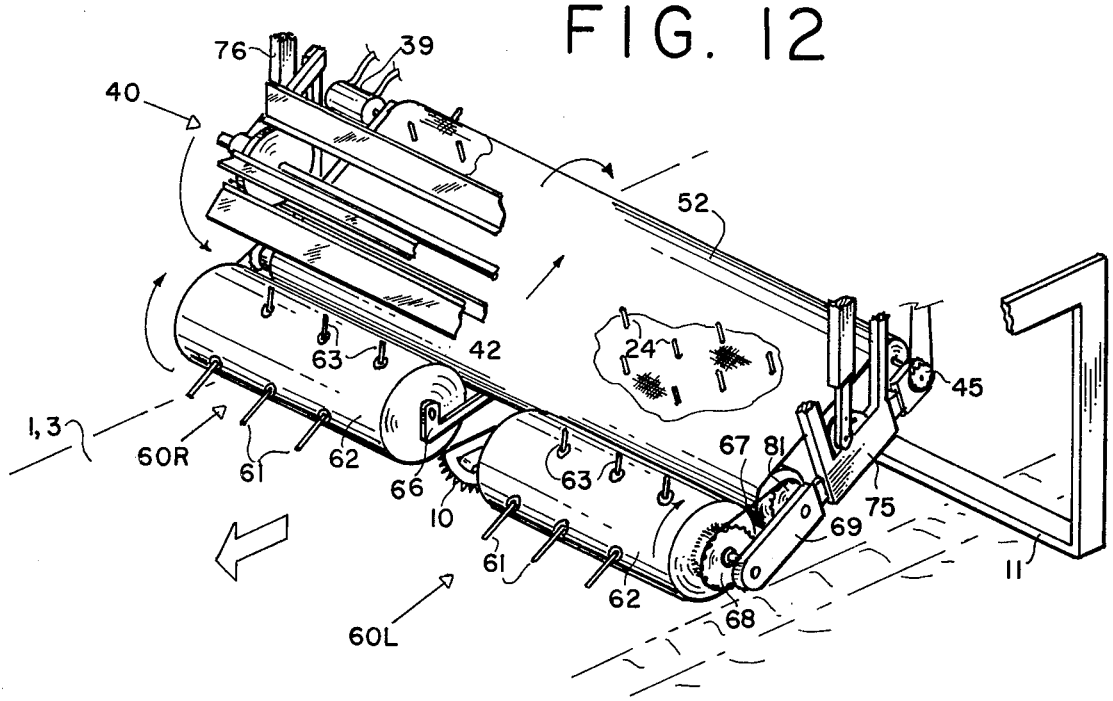
FIG. 12 is a partial schematic view of an alternative embodiment of the invention utilizing a retracting finger device as a plant lifting means.

Turning now to FIG. 12, another alternative embodiment is shown in a partial cutaway perspective view. It may be noted that this version of the invention is very similar to the first alternative embodiment shown in FIG. 11, with the difference concerned with the plant lifting means. The rotating brushes of FIG. 11 are here replaced with a novel retracting finger pick up mechanism, 60R and 60L, with one installed on either side of cutter 10 and just ahead of belt 52. Each mechanism 60 consists of a hollow cylindrical drum 62 pivoted on a fixed shaft 65, best seen in FIG. 13, and rotated by chain drive 67 and sprocket 68 via sprocket 81 from the drive for belt 52, turning clockwise as viewed from the left end as indicated by the arrows in FIG. 12. As drums 62 rotate, fingers 61 extend fully directly in front and in the direction of motion of the harvester as indicated by the open faced arrows. As the drums 62 continue to rotate, fingers 61 will begin to retract with full retraction occuring when fingers 61 have been rotated to the rear. The retracted fingers at the rear then begin to extend as rotation continues until they are again fully extended as they reach the forward position. This action allows belt 52 to be quite close to the rear of drums 62 without interference from the retracted fingers. The extended fingers can be made much longer than non-retracting fingers to provide improved lifting action of the plant foilage.

Figure 13:
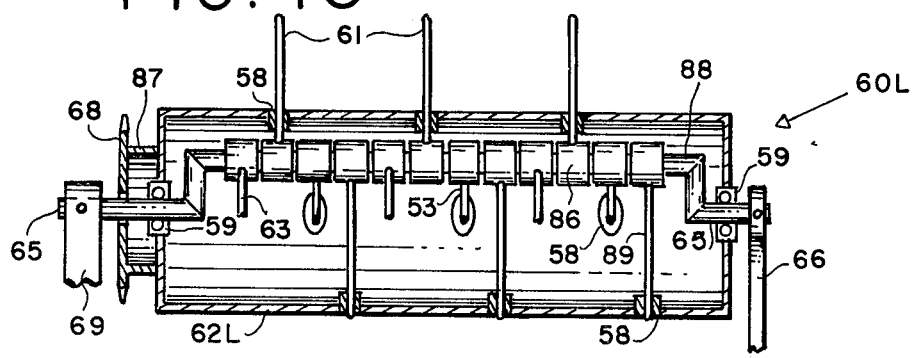
FIG. 13 is a cross sectional view of the retracting finger device of FIG. 12.
Figure 14:
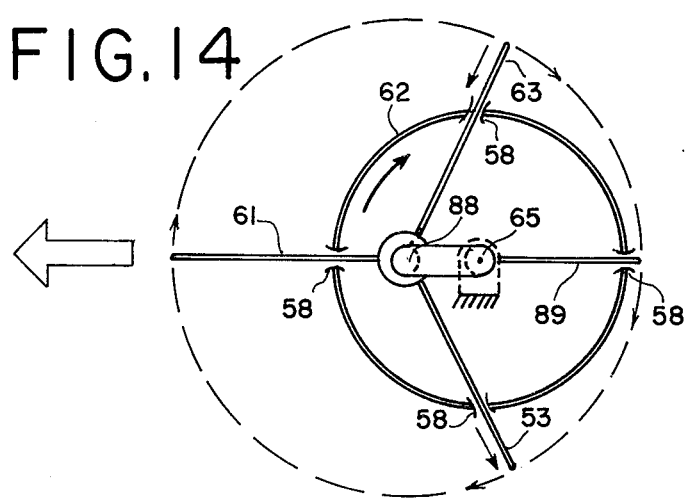
FIG. 14 is a schematic diagram showing the functioning of the device of FIG. 13.

Details of the retracting finger mechanisms 60 are shown in FIG. 13 in which drum 62L is shown in a top horizontal cross section. Mechanism 60L is referred to as an inverted slider crank, with shaft 65 and 88 forming a crank with each end thereof fixed to the frame of the harvester by brackets 66 and 69. Bracket 69 is pinned to the outer end of shaft 65 and is attached to the outside frame 75. The inside end of shaft 65 is affixed to support arm 66 that extends under belt 52 and is attached to frame member 11. A series of bearing sleeves 86 is disposed on fixed shaft 88, with each sleeve having a rod forming its finger extending therefrom. Fingers 61 are shown projecting forward and fully extended from drum 62L. Fingers 89, which project rearward are fully retracted, and fingers 63 projecting upward and fingers 53 projecting downward are partially extended. Drum 62L has bushings 58 through its outer surface through which the fingers slide as drum 62L rotates. Drive sprocket 68 may be noted at the left end of drum 62L attached thereto by cylinder 87 and having clearance for fixed shaft 65. Bearings 59 are provided for rotation of drum 62L on shafts 65. The action of the inverted slider and crank mechanism may best be understood from the schematic diagram of FIG. 14. Crank 65 and 88 is stationary and drum 62 rotates clockwise as the harvester moves forward in the direction of the open faced arrow. The locus of the ends of the fingers 61, 63, 53, and 89 is shown by the dashed circle. As drum 62 rotates, each bushing 58 swings its finger around the crank shaft 88 causing the finger to slide in its bushing. The arrows indicate the relative movements of the elements of the diagram. Drum 62R, on the right side of the harvester, has the opposite construction to drum 62L.

The retracting and extending action of the lifting fingers in this alternative embodiment of the invention permits the bottom of cylinders 62 to be closer to the ground than the fixed-finger type of lifter, and the lower hanging foliage may be caught and lifted more positively providing additional protection against fruit damage.

Having now described in detail a new method and apparatus for mechanically harvesting tomatoes and other produce growing on plastic mulch covered beds, it will be obvious to those of ordinary skill in the art to make various changes and modifications without departing from the scope and the spirit of the invention. The particular implementations shown herein is only to characterize the invention and is not to limit it to such details.

I claim:

1. Apparatus for movement along seed beds covered by a plastic mulch to harvest tomato plants and the like growing through said plastic mulch without damage thereto, comprising:

a supporting frame;

a pair of gage wheels movably attached to said frame;

at least one hydraulic actuator connected to said frame and said gage wheels, said actuator adapted to move said frame vertically with respect to said gage wheels;

a reciprocating cutter supported by said frame a selected distance above the surface of said plastic mulch, said cutter having an upper fixed shear blade having a plurality of V-shaped teeth at the outer end thereof, and a lower reciprocating shear blade having a plurality of V-shaped teeth at the outer end thereof in operative alignment with said fixed shear blade, said upper and lower blades being narrow with respect to the width of said beds, said cutter arranged to contact and cut the stems of said plants;

a height sensor affixed to said frame having upper and lower switches and a switch operating arm, said arm arranged to contact the surface of said plastic mulch, to close said upper switch only when said cutter is less than said selected distance above said surface, and to close said lower switch only when said cutter is more than said selected distance above said surface;

a hydraulic control system having a source of hydraulic pressure and an electrically controlled hydraulic valve, said valve electrically connected to said switches and hydraulically connected to said actuator whereby closing of said upper switch controls said valve to energize said actuator to raise said frame with respect to said wheels and closing of said lower switch controls said valve to energize said actuator to lower said frame with respect to said wheels thereby maintaining said cutter said selected distance above said surface;

a pair of first endless moving conveyor belts having a plurality of projecting fingers, said conveyor belts supported by said frame above said beds in inclined relationship thereto with the forward edges parallel to said beds and spaced therefrom to permit said fingers to clear said surface, one of said belts disposed on either side of said cutter with said forward edges ahead of said cutter, said conveyor belts moving in a direction to cause said projecting fingers to engage forward portions of said plants and to lift pendant portions thereof clear from said surface prior to cutting of the stems of said plants, said conveyor belts then engaging said plants after cutting of said stems to move said cut plants rearwardly and upwardly with respect to said cutter;

a second endless moving conveyor belt having a plurality of projecting fingers, said second conveyor belt disposed between said pair of first conveyor belts and having its forward end behind said shear blades of said cutter whereby said second conveyor belt engages said cut plants and cooperates with said first conveyor belts in moving said plants rearwardly and upwardly; and a rotating reel having a shaft and a plurality of flexible flat paddles radially projecting from said shaft, said reel supported by said frame with said shaft parallel to and above said forward edges of said first conveyor belts so as to cause said paddles to contact the upper portions of said cut plants and to urge said cut plants rearwardly to engage said fingers of said conveyor belts.

* * * * *